(12) United States Patent
Munetomo et al.

(10) Patent No.: US 9,903,517 B2
(45) Date of Patent: Feb. 27, 2018

(54) FLANGE COUPLING PART REINFORCING JIG

(71) Applicants: OKAYAMA CITY, Okayama (JP); TAISEI KIKO CO., LTD., Osaka (JP)

(72) Inventors: Nobuo Munetomo, Okayama (JP); Mitsunobu Yano, Okayama (JP); Shinobu Yasui, Okayama (JP); Hironori Sasaki, Osaka (JP)

(73) Assignees: Okayama City, Okayama (JP); Taisei Kiko Co., Ltd., Osaka (JP)

( * ) Notice: Subject to any disclaimer, the term of this patent is extended or adjusted under 35 U.S.C. 154(b) by 0 days.

(21) Appl. No.: 15/307,251

(22) PCT Filed: May 9, 2014

(86) PCT No.: PCT/JP2014/062487
§ 371 (c)(1),
(2) Date: Oct. 27, 2016

(87) PCT Pub. No.: WO2015/170407
PCT Pub. Date: Nov. 12, 2015

(65) Prior Publication Data
US 2017/0051855 A1    Feb. 23, 2017

(51) Int. Cl.
*F16L 23/036*    (2006.01)
(52) U.S. Cl.
CPC .................. *F16L 23/036* (2013.01)
(58) Field of Classification Search
CPC ....... F16L 23/036; F16J 13/06; Y10T 403/64; Y10T 403/645; Y10T 403/648
See application file for complete search history.

(56) References Cited

U.S. PATENT DOCUMENTS 3,458,221 A * 7/1969 Wheeler ................. F16L 23/20
177/171
3,771,819 A * 11/1973 Hitchins, III ........... F16L 37/18
285/312
(Continued)

FOREIGN PATENT DOCUMENTS

DE    1079400 B1    4/1960
DE    1196449 B *    7/1965 ............ F16L 23/036
(Continued)

OTHER PUBLICATIONS

European Search Report dated Dec. 8, 2017.

*Primary Examiner* — Daniel J Wiley
(74) *Attorney, Agent, or Firm* — Dilworth & Barrese, LLP

(57) ABSTRACT

A flange coupling part reinforcing jig includes a pair of clamping members having pressing parts capable of coming into contact respectively with outer faces of two flange parts which are bolt-connected and a fastening means for fixedly fastening the two clamping members by drawing them to each other in a flange coupling direction, with the pressing parts of the clamping members being placed in abutment with the outer faces of the flange parts. At portions of the two clamping members opposed to each other in the flange coupling direction, there are formed an inner fitting part and an outer fitting part which are fitted to each other in the flange coupling direction at positions of the two flange parts more radially outward than outer circumferential faces of the two flange parts.

11 Claims, 9 Drawing Sheets

(56) References Cited

U.S. PATENT DOCUMENTS

| | | | | |
|---|---|---|---|---|
| 3,981,409 A | * | 9/1976 | Flanders | B65D 7/24 |
| | | | | 220/324 |
| 4,003,590 A | * | 1/1977 | Hefel | F16L 23/02 |
| | | | | 285/328 |
| 4,690,298 A | * | 9/1987 | Schepers | F16B 2/10 |
| | | | | 220/325 |
| 4,871,278 A | * | 10/1989 | Gerlach | F16B 2/12 |
| | | | | 24/525 |
| 5,404,832 A | * | 4/1995 | Hart | E21B 33/038 |
| | | | | 166/96.1 |
| 2007/0278793 A1 | | 12/2007 | Le Devehat | |
| 2009/0295155 A1 | | 12/2009 | Keller-Staub | |

FOREIGN PATENT DOCUMENTS

| | | |
|---|---|---|
| DE | 1196449 B1 | 7/1965 |
| GB | 739008 A | 10/1955 |
| JP | H06-53888 U | 7/1994 |
| JP | 2005-233210 A | 9/2005 |
| JP | 2007-522391 A | 8/2007 |
| JP | 2008-128297 A | 6/2008 |
| JP | 4157413 B | 10/2008 |
| JP | 4363565 B | 11/2009 |

* cited by examiner

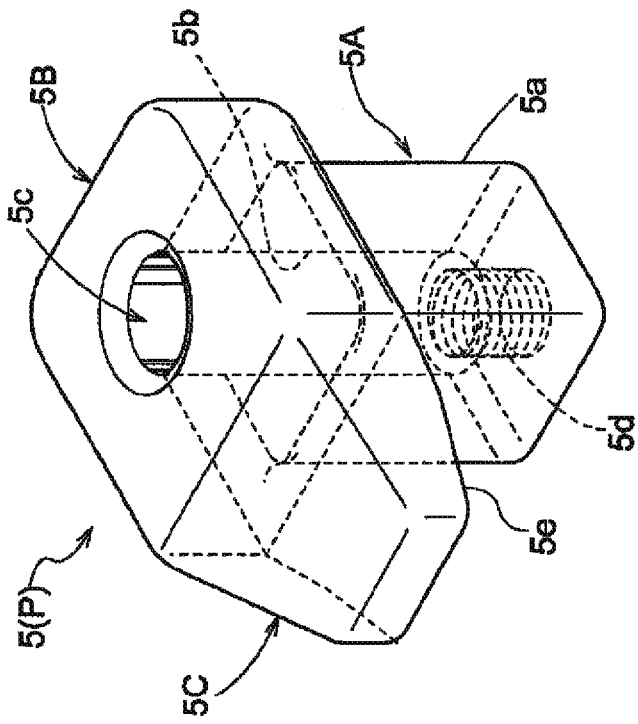
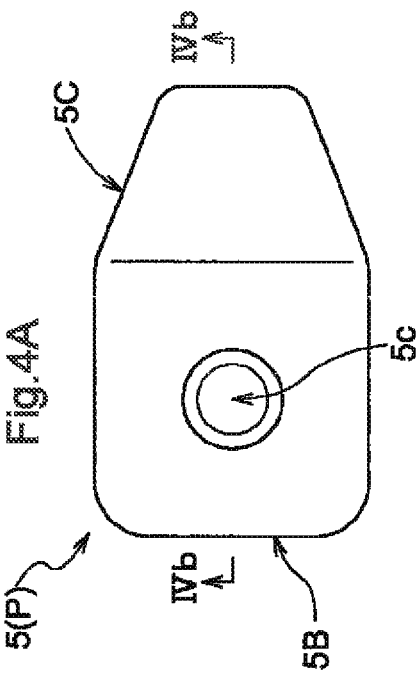
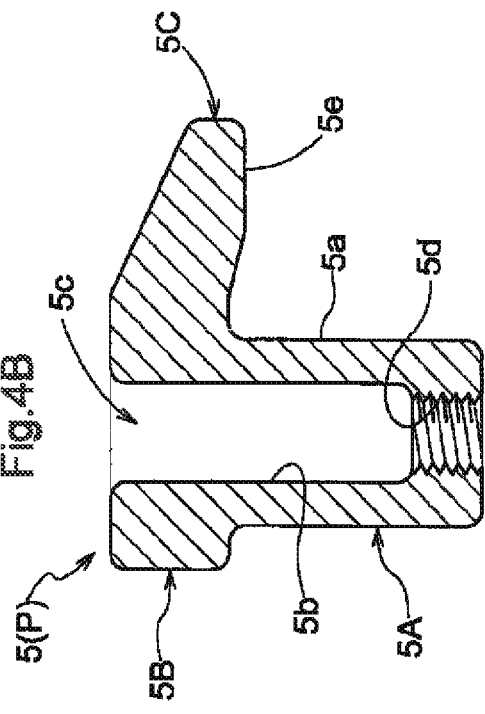

FLANGE COUPLING PART REINFORCING JIG

TECHNICAL FIELD

The present invention relates to a flange coupling part reinforcing jig including a pair of clamping members having pressing parts capable of coming into contact with outer faces of two flange parts which are bolt-connected, and a fastening means for fixedly fastening the two clamping members by drawing them to each other in a flange coupling direction, with the pressing parts of the clamping members being placed in abutment with the outer faces of the flange parts.

BACKGROUND ART

As an example of such flange coupling part reinforcing jig as described above, Patent Document 1, for instance, discloses an arrangement where at portions of the two clamping members opposed to each other in the flange coupling direction, there are formed a pair of bolt threading holes (an example of "fastening means") formed at positions more radially outward than the outer circumference faces of the two flange parts, and two threading bolts (an example of "fastening means") are threaded to and between the pair of bolt threading holes, with pressing parts formed at positions of the two clamping members more radially inward than the bolt threading holes being placed in abutment with the outer faces of the two flange parts.

Further, as another example of such flange coupling part reinforcing jig as described above, Patent Document 2, for instance, discloses a following arrangement. Namely, one of the two clamping members is provided in form of an approximately angular hook-shaped member (approximately U-shaped member) having a pair of leg portions, the other of the two clamping members is provided in form of a bolt (as example of "fastening means") which is threadingly fitted to one of the pair of leg portions. The leading end of the bolt and an inner circumferential face of the other leg portion of the angular hook-shaped member to which the bolt is not attached are provided as pressing parts for pressing outer faces of the two flange parts respectively. And, as the bolt is threaded to the one leg portion and further fastened, the leading end of the bolt and the inner circumferential face of the other leg portion are placed in abutment with the outer faces of the flange portions respectively, and the flange parts are fastened and fixed by the pair of clamping members (the angular hook-shaped member (U-shaped members and the bolt).

It is said that by fastening and fixing the pair of clamping members by the fastening means with use of such flange coupling part reinforcing jigs described above, there can be realized coupling reinforcement of the two flange parts by a plurality of bolts/nuts as well as increased fastening strength by the fastening means, consequently, inadvertent separation of the two flange parts can be prevented even in the event of application of a force in the bending or pulling direction to the two flange parts, so that gas-tightness can be maintained.

CITATION LIST

Patent Literature

Patent Document 1: Japanese Registered Patent No. 4157413

Patent Document 2: Japanese Registered Patent No. 4363565

SUMMARY OF INVENTION

Technical Problem

Here, in order to further improve earthquake-resistance of a conduit including two flange parts, it is desired to reinforce existing or newly installed flange parts to those having the Class-A earthquake resistance performance equivalent to that of an earthquake-resistant conduit (having an anti-separation force of 3 DkN or more (D is a nominal diameter)).

Further, it is also desired to realize an arrangement that can reliably prevent leakage of fluid flowing therein through effective prevention of separation between the two flange parts in the event of application of a force in the bending or pulling direction to the two flange parts.

Moreover, in case one of the two flange parts is a flange part formed at one end of a short pipe or a repair valve or the like, when the flange coupling part reinforcing jig is to be attached to the two flange parts, this flange coupling part reinforcing jig can accidentally interfere with the flange part formed at the other end of the short pipe or the repair valve or the like, so it is desired to avoid such interference as much as possible.

In addressing to the above-described respects, with the flange coupling part reinforcing jig disclosed in Patent Document 1 cited above, the pair of clamping members having the pressing parts which come into abutment with the outer faces of the two flange parts respectively are fastened and fixed by two threading blots threaded to and between the pair of bolt threading holes formed on the radially outer side of these pressing parts. So, the pair of clamping members are fastened and fixed only by the pair of bolt threading holes and the two threading bolts substantially. For this reason, in the event of application of a force in the bending or pulling direction to the two flange parts, this force application will be concentrated at the threading portions of the pair of bolt threading holes and the two threading bolts via the flange parts and the pair of clamping members, so that inadvertent elongation of the two threading bolts or breakage of the threads of the threading portions or the like, which will result eventually in separation between the two flange parts. In such case, leakage of fluid can occur via the gap formed between the flange parts. Also, it is difficult to reinforce the two flange parts to the performance equivalent to the earthquake-resistance performance of the above-described earthquake-resistance conduit.

Further, with the flange coupling part reinforcing jig disclosed in Patent Document 2 cited above, the bolt is threadingly fitted to one leg portion of the angular hook-shaped member (U-shaped member) from the outer side in the pipe axis direction and the leading end of this bolt is placed in abutment with the outer face of the flange part. Therefore, at an outer portion in the pipe axis direction of the angular hook-shaped member (U-shaped member), there is required a space for a work for thread-fitting the bolt to the one leg portion. In case the one of the two flange parts is a flange part formed at one end of a short conduit or a repair valve or the like, the bolt of this flange coupling part reinforcing jig can interfere with the flange part formed at the other end of the conduit or the repair valve or the like, thus making fitting difficult or even impossible. Moreover, if the leading end of the bolt is in abutment with the outer face of the flange, this can create a damage in this outer face, thus leading to corrosion or the like. And, if a protecting member is fitted to the leading end of the bolt for preventing such damage, this will result in increase of protrusion amount of this bolt to the outer portion in the pipe axis direction of the angular hook-shaped member (U-shaped member). Then, unless a large work space is formed at this outer portion, fitting of the flange coupling part reinforcing jig to the two flange parts may become even more difficult or impossible.

The present invention has been made in view of the above-described state of the art and its object is to provide a flange coupling part reinforcing jig capable of reinforcing a conduit including two flange parts into an earthquake-resistant conduit having a predetermined earthquake-resistance performance and yet capable of easily and economically preventing separation or displacement between the two flange parts.

Solution to Problem

For accomplishing the above-noted object, a flange coupling part reinforcing jig according to the present invention, comprises:

a pair of clamping members having pressing parts capable of coming into contact respectively with outer faces of two flange parts which are bolt-connected; and a fastening means for fixedly fastening the two clamping members by drawing them to each other in a flange coupling direction, with the pressing parts of the clamping members being placed in abutment with the outer faces of the flange parts;

wherein at portions of the two clamping members opposed to each other in the flange coupling direction, there are formed an inner fitting part and an outer fitting part which are fitted to each other in the flange coupling direction at positions of the two flange parts more radially outward than outer circumferential faces of the two flange parts.

With the above-described characterizing feature, at portions of the two clamping members opposed to each other in the flange coupling direction, there are formed an inner fitting part and an outer fitting part which are fitted to each other in the flange coupling direction at positions of the two flange parts more radially outward than the outer circumferential faces of the two flange parts. So, when the fastening means is fastened with the respective pressing parts of the pair of clamping members being placed in abutment with the outer faces of the two flange parts, the two clamping members will be drawn to each other in the flange coupling direction, in the course of which the inner fitting part will be fitted within the outer fitting part, so that the inner fitting part and the outer fitting part will be overlapped with each other in the flange coupling direction (axial direction).

With the above, when the pair of clamping members are fastened and fixed by the fastening means, even if a force is applied to the two flange parts in the bending direction (radial direction), this force can be received not only by the fastened part of the fastening means, but also by the overlapped portion between the inner fitting part and the outer fitting part. As a result, the stress applied to the fastening portion of the fastening means can be reduced. Therefore, the coupling strength between the two flange parts by the flange coupling part reinforcing jig can be improved, so that separation or displacement between the two flange parts or leakage of fluid associated therewith can be effectively prevented and the earthquake-resistance performance of the conduit can be improved also.

Consequently, it has become possible to reinforce a conduit including two flange parts into an earthquake-resistant conduit having a predetermined earthquake-resistance performance (having an anti-separation force of 3 DkN or more (D is a nominal diameter)) and yet to easily and economically prevent separation or displacement between the two flange parts.

According to a further characterizing feature of the flange coupling part reinforcing jig relating to the present invention, when the inner fitting part and the outer fitting part of the two clamping members are fitted to each other, a receded portion is formed by the pressing part and the inner fitting part of one clamping member together with the pressing part and the outer fitting part of the other clamping member, and this receded portion is externally attachable from a radially outer side relative to portions of the two flange parts adjacent bolt-connected positions thereof and this external attachment portion is configured as an attachment regulating portion that comes into contact with outer circumferential faces of the two flange portions, thus regulating the external attachment portion to a set external attachment position.

With the above-described characterizing feature, when the receded portion formed by the two pressing parts and the inner and outer fitting parts of the two clamping members are externally attached to the adjacent portions of the two flange parts adjacent at the bolt connecting part in the circumferential direction from the radially outer side, the outer fitting part which is positioned more radially outward than the outer circumferential faces of the two flange parts comes into contact with these outer circumferential faces. So that, this outer fitting part can function as attachment regulating portion for regulating the flange coupling part reinforcing jig to the set external attachment position. As a result, the work of attaching the flange coupling part reinforcing jig can be facilitated and made reliable. Moreover, when the pair of clamping members are fastened and fixed by the fastening means, the outer face of the outer fitting part in which the inner fitting part is fitted is placed in contact with the outer circumferential faces of the two flange parts. Thus, in the event of application of a force to the two flange parts in the bending direction (radial direction), this force can be received by the contacting portions between the outer face of the outer fitting part and the outer circumferential faces of the two flange parts. Consequently, the stress applied to the fastening means and the overlapped portion between the inner fitting part and the outer fitting part can be reduced.

Therefore, the flange coupling part reinforcing jig can be attached to the two flange parts easily. Also, the coupling strength between the two flange parts provided by the flange coupling part reinforcing jig can be further improved, so that the separation or displacement between the two flange parts or fluid leakage associated therewith can be prevented in an even more reliable manner and the earthquake-resistant performance of the conduit can be further improved.

According to a still further characterizing feature of a flange coupling part reinforcing jig relating to the present invention, the inner fitting part and the outer fitting part have fitting shapes incapable of rotation relative to each other.

With the above-described characterizing feature, the inner fitting part and the outer fitting part are fitted to each other in a state not capable of rotation relative to each other in the flange coupling direction. Therefore, relative rotation between the inner fitting part and the outer fitting part, that is, relative rotation between the pair of clamping members, can be prevented. With this, when the flange coupling part reinforcing jig is to be fitted on the two flange parts, upon fitting between the inner fitting part and the outer fitting part of the two clamping members, the pair of clamping members can be fixed in position relative to each other and to a predetermined positional relation to each other. Thus, the attaching work to the two flange parts can be carried out even more easily According to a still further characterizing feature of a flange coupling part reinforcing jig relating to the present invention, the inner fitting part and the outer fitting part are formed cylindrical respectively and a fastening bolt of the fastening means is inserted into cylindrical inner spaces of these inner fitting part and outer fitting part.

With the above-described characterizing feature, the inner fitting part will be fitted within the outer fitting part which is formed cylindrical. In addition, the fastening bolt of the fastening means is inserted into the cylindrical inner space inside the inner fitting part. So, the disposing positions of the inner fitting part and the outer fitting part located at radially outer positions of the outer faces of the two flange parts can be used also as the disposing positions of the fastening bolt. With this, the dimension of the flange coupling part reinforcing jig fitted to the two flange parts and the dimension of the fastening bolt in the flange coupling direction (axial direction) and also the dimension of this flange coupling part reinforcing jig in the radially outward direction (radial direction) can be made smaller, so that space saving can be realized.

According to a still further characterizing feature of a flange coupling part reinforcing jig relating to the present invention, one of the pair of clamping members includes a detachment preventing arm that can come into contact, from a radial inner side, with a head portion of the connecting bolt connecting the two flange parts or a fastening nut to be thread-fitted to this connecting bolt.

With the above-described characterizing feature, even when distortion, deformation or relative displacement or the like occurs in the two flange parts due to the weight of their own or an earthquake or the like, as the detachment preventing arm comes into contact with the head portion of the connecting bolt or the connecting nut from the radially inner side, whereby detachment of the flange coupling part reinforcing jig from the two flange parts can be effectively prevented.

According to a still further characterizing feature of a flange coupling part reinforcing jig relating to the present invention, the detachment preventing arm is formed as a receded portion which extends around the head portion of the connecting bolt or the connecting nut from the radially inner side to the radially outer side.

With the above-described characterizing feature, as the detachment preventing arm is formed as a receded portion which extends around the head portion of the connecting bolt or the connecting nut from the radially inner side to the radially outer side, even when distortion, deformation or relative displacement or the like occurs in the two flange parts, the detachment preventing arm portion formed like a receded portion comes into contact with the head portion of the connecting bolt or the connecting nut in a reliable manner, and this contact state can be maintained. So that, inadvertent detachment of the flange coupling part reinforcing jig from the two flange parts can be prevented in an even more reliable manner. Further, similarly, at whatever position in the circumferential direction of the two flange parts the flange coupling part reinforcing jig may be provided, inadvertent detachment of this flange coupling part reinforcing jig to the lower side from the two flange parts can be prevented.

According to a still further characterizing feature of a flange coupling part reinforcing jig relating to the present invention, the detachment preventing arm extends from a radially inner portion of one of the pair of clamping members, and its extending direction is set as a same direction as a direction when the one clamping member provided with this detachment preventing arm is rotated together with the fastening bolt when this fastening bolt is rotated to a fastening side.

With the above-described characterizing feature, the extension direction of the detachment preventing arm formed to extend from a radially inner portion of one of the two clamping members is set as the same direction as the direction when the one clamping member provided with this detachment preventing arm is rotated together with the fastening bolt when this fastening bolt is rotated to a fastening side. Thus, even if the one clamping member is rotated together in association with fastening of the fastening bolt, the detachment preventing arm comes into contact with the head portion of the connecting bolt or the connecting nut, so that further co-rotation thereof can be prevented. Moreover, as one clamping member is supported by the pressing part, the outer face of the flange part, the detachment preventing arm, the head portion of the connecting bolt or the connecting nut, the fastening work of the fastening bolt can be carried out in a stable manner.

According to a still further characterizing feature of the flange coupling part reinforcing jig relating to the present invention, a side face of the detachment preventing arm opposed to the outer face of the flange part is disposed on a side farther from the outer face of the flange part than the pressing face of the pressing part of the one clamping member provided with this detachment preventing arm.

With the above-described characterizing feature, since a side face of the detachment preventing arm opposed to the outer face of the flange part is disposed on a side farther from the outer face of the flange part than the pressing face of the pressing part of the one clamping member provided with this detachment preventing arm, even when the pressing face of the pressing part is pressed against the outer face of the flange portion with fastening of the fastening means, the detachment preventing arm will not come into contact with the outer face of the flange part, thus applying no load directly to the detachment preventing arm. Thus, breakage of the detachment preventing arm can be prevented.

According to a still further characterizing feature of a flange coupling part reinforcing jig relating to the present invention, the fastening means is comprised of the fastening bolt which is inserted from the outer side of the outer fitting part into the cylindrical inner spaces of the inner fitting part and the outer fitting part and a female threaded portion formed in an inner circumferential face of the inner fitting part and threadingly fitted with the fastening bolt.

With the above-described characterizing feature, since the fastening means is comprised of the fastening bolt which is inserted from the outer side of the outer fitting part into the cylindrical inner spaces of the inner fitting part and the outer fitting part and a female threaded portion formed in an inner circumferential face of the inner fitting part and threadingly fitted with the fastening bolt, the female threaded portion can be disposed at the overlapped portion between the inner fitting part and the outer fitting part inside the cylindrical inner spaces, whereby the length of the fastening bolt can be made relatively short. With this, even when the thickness of the respective flange part is changed according to a nominal diameter of the flange part or a set pressure, it is still possible to effectively prevent protrusion of the leading end of the fastening bolt to the outside of the cylindrical inner spaces.

Consequently, space saving is made possible without inviting deterioration in the outer appearance of the flange coupling part reinforcing jib.

According to a still further characterizing feature of a flange coupling part reinforcing jig relating to the present invention, the fastening means is comprised of the fastening bolt which is inserted from one outer side into the cylindrical inner spaces of the inner fitting part and the outer fitting part through these spaces and a fastening nut to be threadingly fitted on a protruding male threaded portion of the fastening bolt from the other outer side.

With the above-described characterizing feature, since the fastening means is comprised of the fastening bolt which is inserted from one outer side into the cylindrical inner spaces of the inner fitting part and the outer fitting part through these spaces and a fastening nut to be threadingly fitted on a protruding male threaded portion of the fastening bolt from the other outer side, the inner fitting part and the outer fitting part need to be formed cylindrical only, with no need for forming a threaded portion. Thus, the flange coupling part reinforcing jig can be configured simple and inexpensive.

According to a still further characterizing feature of a flange coupling part reinforcing jig relating to the present invention, the female threaded portion is formed at one end on the side of the outer fitting part in the inner circumferential face of the inner fitting part.

With the above-described characterizing feature, since the female threaded portion is formed at one end on the side of the outer fitting part in the inner circumferential face of the inner fitting part, this female threaded portion is to be located at a position adjacent the head portion of the fastening bolt which has been inserted into the cylindrical inner spaces of the inner fitting part and the outer fitting part. With this, the threading portion between the female threaded portion and the male threaded portion of the fastening bolt is disposed adjacent the position where the head portion of the fastening bolt comes into contact with the outer fitting part. As a result, the distance between the head portion of the fastening bolt and this threading portion in the flange coupling direction (axial direction) can be made relative short, so that even in the event of application of a force to the two flange parts in the bending direction (radial direction) or the pulling direction (axis direction), inadvertent elongation or breakage of the fastening bolt can be prevented. Namely since such inadvertent elongation or the like of the fastening bolt can be prevented, separation or displacement between the two flange parts or leakage of fluid associated therewith can be prevented effectively. Moreover, with the possibility of making the above distance relative short, a standard bolt can be used as the fastening bolt. So, the flange coupling part reinforcing jig can be made inexpensively.

BRIEF DESCRIPTION OF DRAWINGS

FIG. 4A is a plan view of a first clamping member,

FIG. 4B is a vertical sectional view of the first clamping member taken on line IVb-IVb in FIG. 4A, FIG. 4C is a perspective view of the first clamping member.

DESCRIPTION OF EMBODIMENTS

Next, with reference to FIGS. 1 through 10, an embodiment of a flange coupling part reinforcing jig P will be explained.

Figure 1:
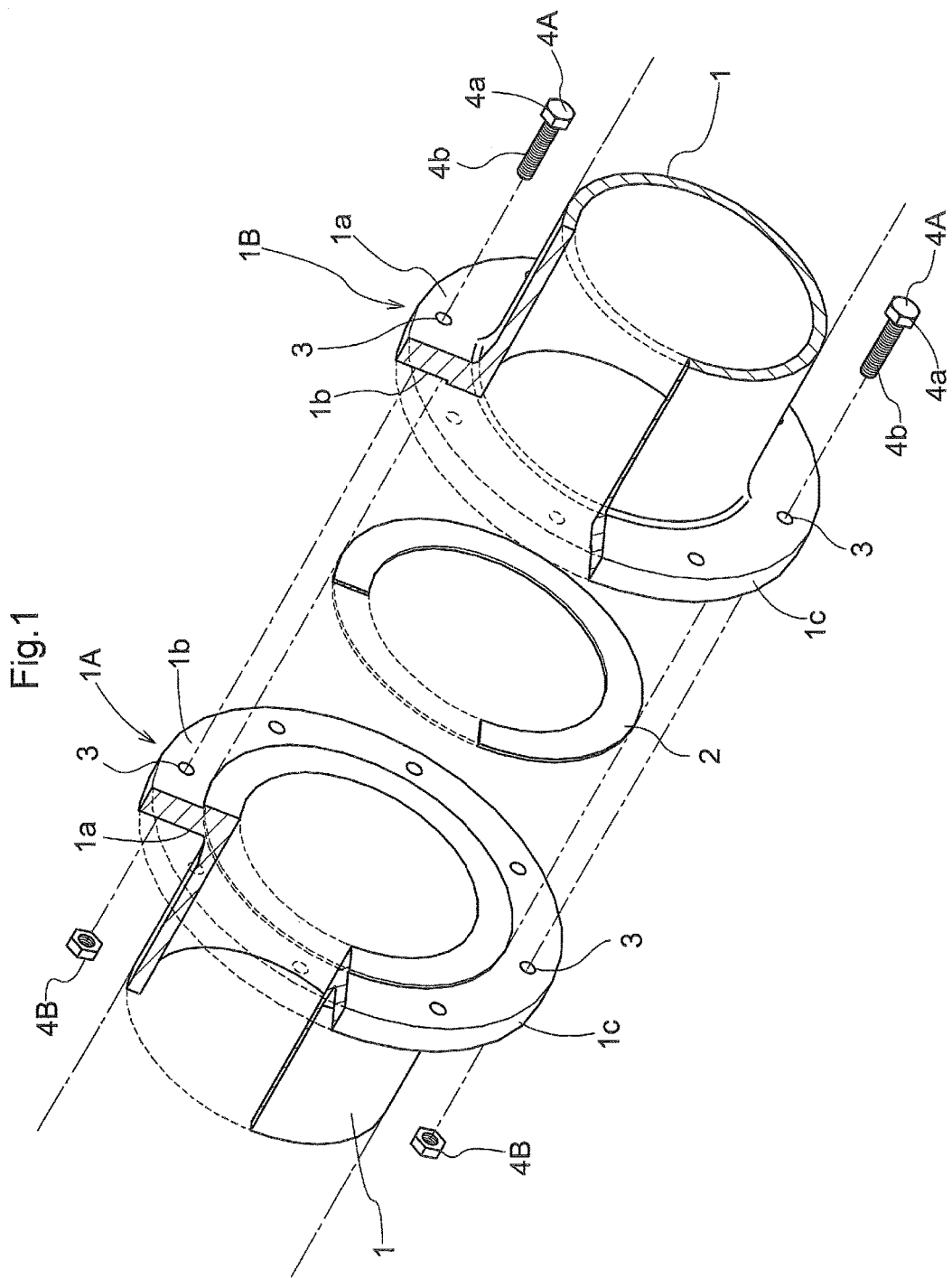
FIG. 1 is an exploded perspective view of two flange parts.
Figure 2:
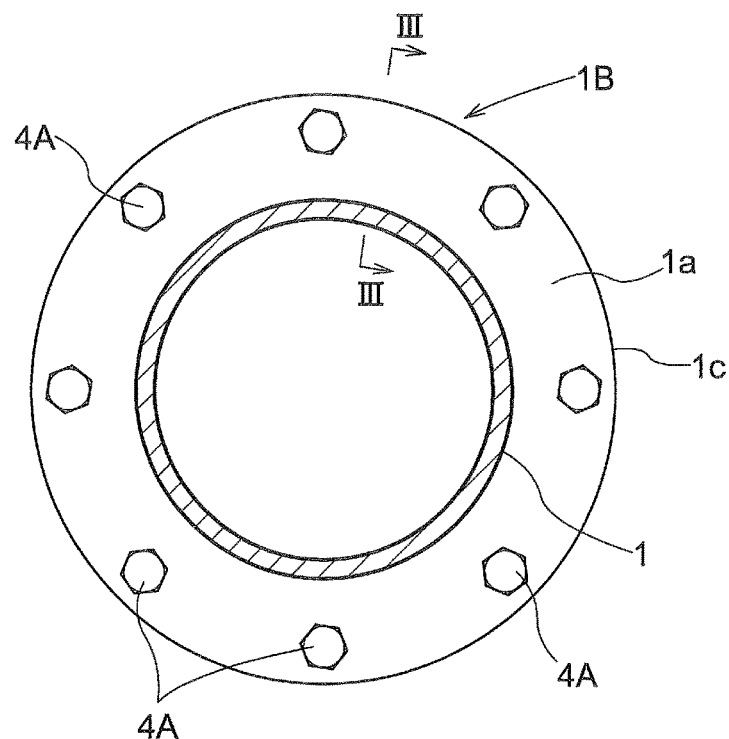
FIG. 2 is a side view showing the two flange parts.
Figure 3:
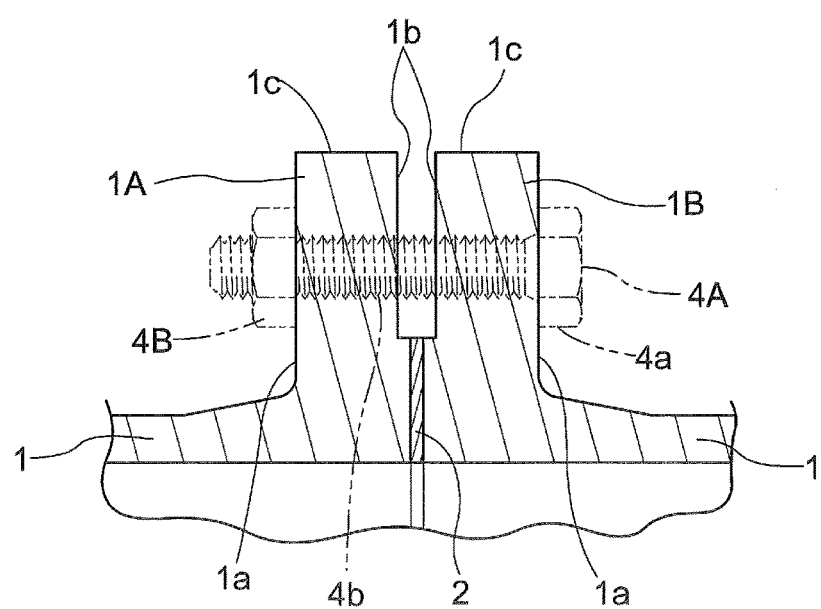
FIG. 3 is a vertical section showing the two flange parts.

FIGS. 1 through 3 show flange coupling parts provided midway n a fluid pipe line (a conduit). In this, two flange parts 1A, 1B formed like disc-like extensions on radially outer sides of ends of two water pipes 1, 1 formed of cast iron as an example of the fluid pipe are coupled to each other via a ring-shaped sheet-like gasket 2 disposed between these two flange parts 1A, 1B, with using a plurality of connecting bolts 4A and connecting nuts 4A (in this embodiment, eight of them for each). The two flange parts 1A, 1B respectively define a plurality of through holes 3 (in this embodiment, at eight portions each) extending therethrough in the flange coupling direction (axial direction) and arranged in the circumferential direction and equidistantly spaced apart from each other. The connecting bolts 4A are inserted into and through these through holes 3 and the connecting nuts 4B are thread-fitted on the leading ends of male threaded portions 4b of the connecting bolts 4A. Incidentally, the two flange portions 1A, 1B provided in this embodiment are the so-called RF flanges.

Here, in the following discussion, in the two flange parts 1A, 1B, faces thereof on the side of water pipe protrusion will be referred to as outer faces 1a, 1b and faces thereof opposed to each other in the flange coupling direction (axial direction) when the two flange parts 1A, 1B are coupled to each other by the connecting bolts 4A and the connecting nuts 4B will be referred to as coupling faces 1b, 1b and further faces on the radially outer sides of the two flange parts 1A, 1B will be referred to as outer circumferential faces 1c, 1c, respectively.

As shown in FIGS. 4-9, the flange coupling part reinforcing jig P relating to this application includes a first clamping member 5 having a pressing part 50 that can come into contact with the outer face 1a of the flange part 1A, a second clamping member 6 having a pressing part 6B that can come into contact with the outer face 1a of the flange part 1B in the two flange parts 1A, 1B which are bolt-connected each other in the manner described above, and a fastening means 7 configured to draw the first clamping member 5 and the second clamping member 6 toward each other in the flange coupling direction (axial direction) and fixedly fastening these, with the pressing part 50 of the first clamping member 5 and the pressing part 6B of the second clamping member 6 being placed in abutment with the outer faces 1a, 1a of the two flange parts 1A, 1B respectively As shown in FIG. 4 and FIGS. 6 through 9, the first clamping member 5 is formed of a metal material and comprises integrally an inner fitting part 5A which has an approximately bottomed angular tube-like shape (an example of a cylindrical shape) having an approximately square-shaped outer face 5a and a circular inner circumferential face 5b in its cross sectional view, a brim-like portion 5B extending to the outer side over the entire circumference from the outer face 5a of the inner fitting part 5A at one end of this inner fitting part 5A, and the pressing part 50 extending further outwards from one side of the four sides of the brim-like portion 5B.

The inner fitting part 5A has an approximately square shape as seen in a side view thereof (see FIG. 4). Inside the inner fitting part 5A, there is formed a cylindrical inner space 5c having a cylindrical shape for allowing insertion of the male threaded portion 7a of the fastening bolt 7A of the fastening means 7 which will be described later. An inside diameter of the cylindrical inner space 5c is slightly larger than an outside diameter of the male threaded portion 7a of the fastening bolt 7A.

The brim-like portion 5B has an approximately square shape as seen in its side view and defines the above-described cylindrical inner space 5c extending therethrough at the center portion thereof as seen in the cross sectional view (see FIG. 4).

In the cylindrical inner space 5c, a side thereof where the brim-like portion 5B and the pressing part 5C are formed is opened and on the side opposite the side where the brim-like portion 5B and the pressing part 5C are formed, a female threaded portion 5d thread-engageable with the male threaded portion 7a of the fastening bolt 7A is formed as an opening extending through the bottom portion of the inner fitting part 5A. Namely, the female threaded portion 5d is formed at the end opposite the side where the brim-like portion 5B and the pressing part 5C are formed, in the inner circumferential face 5b of the cylindrical inner space 5c of the inner fitting part 5A.

The pressing part 5C is formed as a slightly tapered shape as seen in its side view (see FIG. 4(a)) and is tapered as the pressing part 5C is inclined toward the female threaded portion 5d as it extends toward the leading end as seen in the vertical sectional view thereof. And, the leading end portion of the pressing part 5C on the side of the female threaded portion 5d is formed as a pressing face 5e perpendicular to the outer face 5a of the inner fitting part 5A.

As shown in FIGS. 5 through 9, the second clamping member 6 is formed of a metal material and comprises integrally an outer fitting part 6A which has an approximately bottomed angular tube-like shape (an example of a cylindrical shape) having approximately square-shaped outer and inner faces 6a, 6b in its cross sectional view, a pressing part 6B extending to the outer side from one side of the four sides of the outer face 6a of this outer fitting part 6A, and a detachment preventing arm 6C extending from the leading end portion of the pressing part 6B.

Figure 5A:
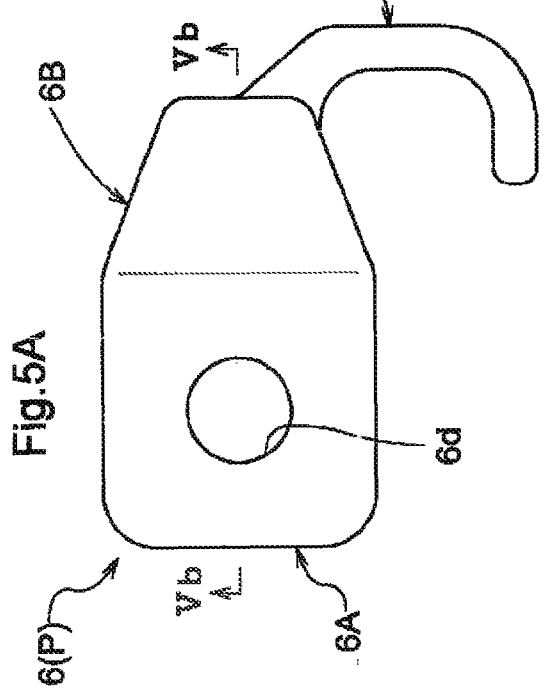
FIG. 5A is a plan view of a second clamping member.
Figure 5B:
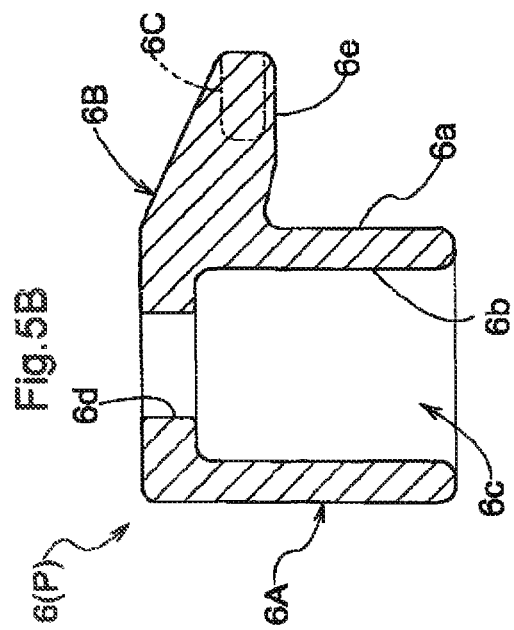
FIG. 5B is a vertical sectional view of the second clamping member taken on line Vb-Vb in FIG. 5a, FIG. 5C is a perspective view of the second clamping member.
Figure 5C:
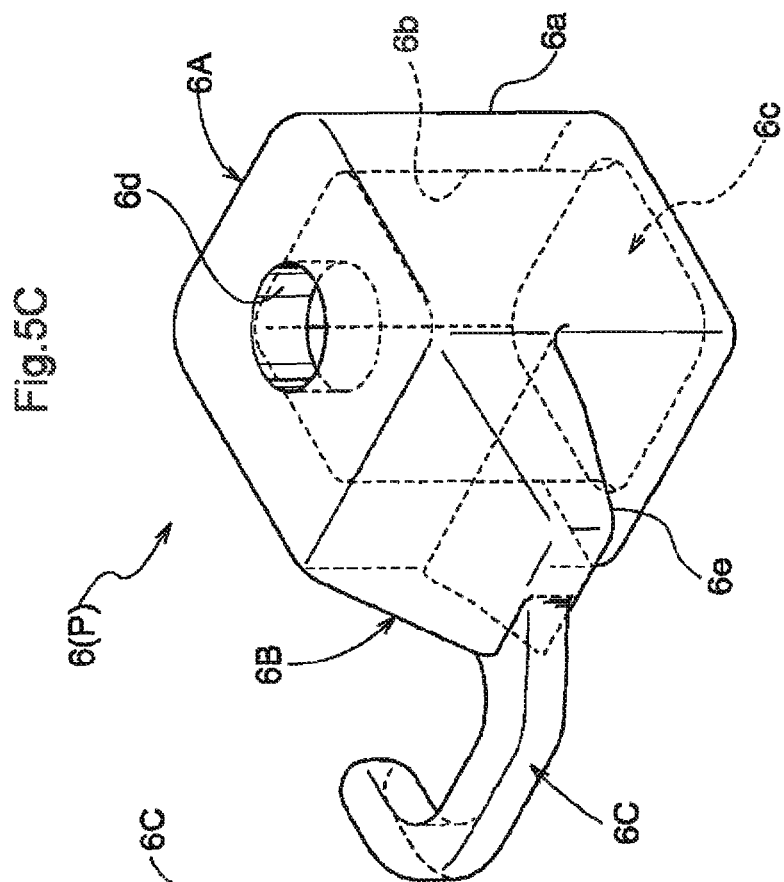

The outer fitting part 6A has an approximately square shape as seen in a side view thereof (see FIG. 5). Inside the outer fitting part 6A, there is formed a cylindrical inner space 6c having a cylindrical shape for allowing insertion of the inner fitting part 5A of the first clamping member 5. The cylindrical inner space 6c is formed as an approximately square shape in its sectional view and slightly larger than the inner fitting part 5A which has an approximately square shape in its sectional view. Therefore, the fitting arrangement between the outer face 5a of the inner fitting part 5A and the inner face 6b of the outer fitting part 6A is configured such that when the inner fitting part 5A is inserted (fitted) into the cylindrical inner space 6c of the outer fitting part 6A, sliding movement in the inserting direction (the longitudinal direction of the cylindrical inner space 6c) is allowed, but relative rotation around the inserting direction (around the axis along the longitudinal direction of the cylindrical inner space 6c) is inhibited.

Further, in the cylindrical inner space 6c, a side thereof opposite to the side where the pressing part 6B is formed is opened, and on the side where the pressing part 6B is formed, there is formed an insertion hole 6d into which the male threaded portion 7a of the fastening bolt 7A can be inserted, but the head portion 7b thereof cannot be inserted, with this insertion hole 6d extending through the bottom portion of the outer fitting part 6A. Incidentally, when the male threaded portion 7a of the fastening bolt 7A is inserted into the insertion hole 6d, there is formed a predetermined gap between the outer circumferential face of the male threaded portion 7a and the inner circumferential face of the insertion hole 6d (see FIG. 9).

The pressing part 6B, like the pressing part 5C of the first clamping member 5 described above, is formed as a slightly tapered shape as seen in its side view (see FIG. 5(a)) and is tapered as the pressing part 5C is inclined toward the side opposite the side where the pressing part 6B is formed as it extends toward the leading end as seen in the vertical sectional view thereof. And, the leading end portion of the pressing part 6B on the side opposite the insertion hole 6d is formed as a pressing face 6e perpendicular to the outer face 6a of the outer fitting part 6A.

The detachment preventing arm 6C is an approximately U-shaped member extending concavely from the leading end portion of the pressing part 6B which has a tapered shape as seen in its side view (see FIG. 5(a), (c)) and has a slightly larger diameter than the outer circumference of the head portion 4a so as to be able to surround at least a part of the head portion 4a of the connecting bolt 4A. Further, as seen its vertical sectional view, of the faces together constituting the detachment preventing arm 6C, the face opposite the insertion hole 6d in the longitudinal direction of the cylindrical inner space 6c is more receded toward the insertion hole 6d than the pressing face 6e.

As shown in FIGS. 6 through 9, the fastening means 7 consists essentially of the above-described fastening bolt 7A which is inserted into the cylindrical inner space 6c via the insertion hole 6d from the outer side of the outer fitting part 6A and the female threaded portion 5d formed in the inner circumferential face 5b of the inner fitting part 5A.

Next, there will be explained a procedure of fitting the flange coupling part reinforcing jig P to the two flange portions 1A, 1B connected to each other by the plurality of connecting bolts 4A and connecting nuts 4B.

Figure 6:
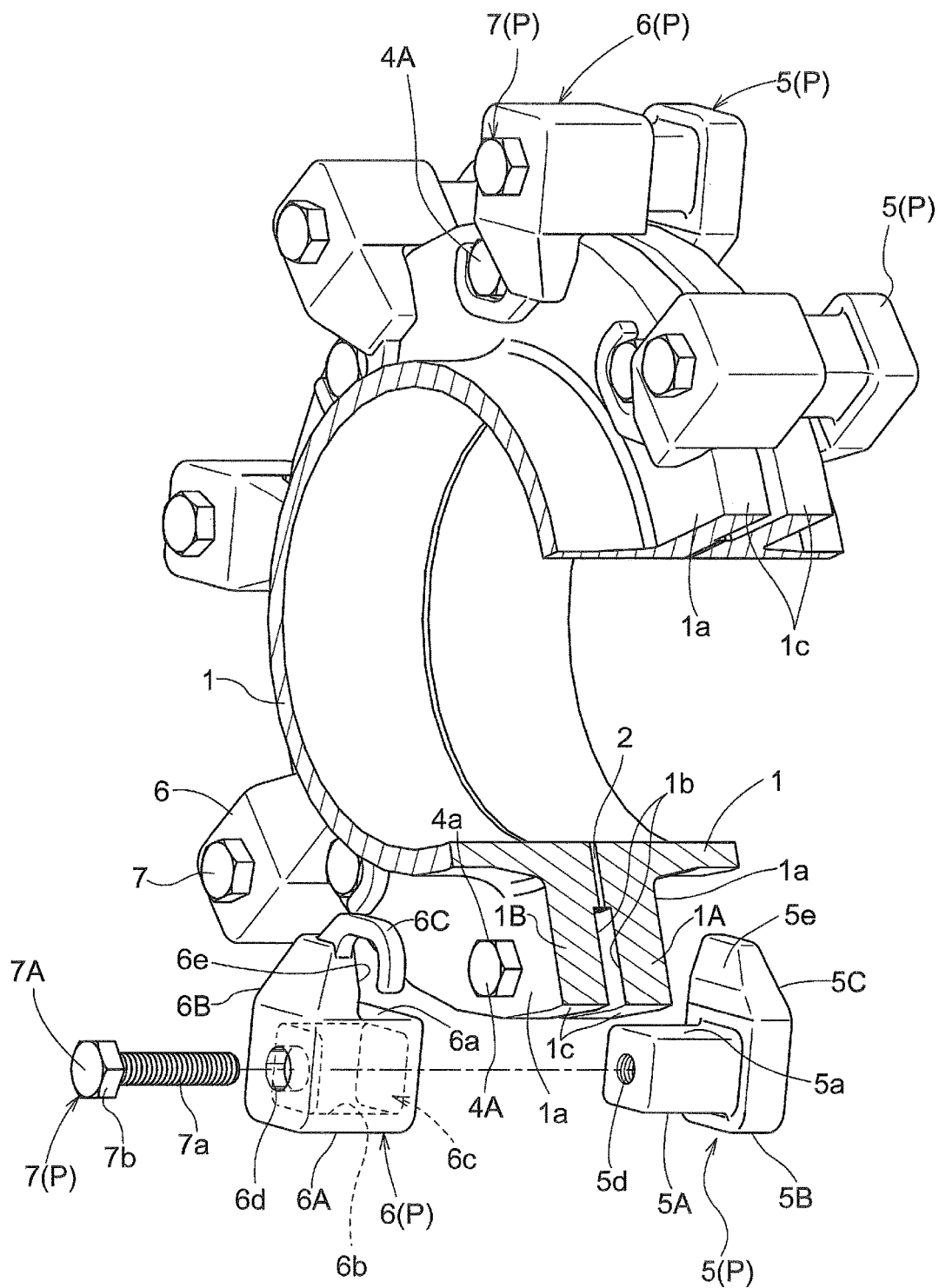
FIG. 6 is a perspective view showing attachment state of the first and second clamping members.

As shown in FIG. 6, the inner fitting part 5A of the first clamping member 5 and the outer fitting part 6A of the second clamping member 6 which parts are formed at portions opposed to each other in the flange coupling direction are fitted to each other in the flange coupling direction as a position more radially outward than the outer circumferential faces 1c, 1c of the two flange parts 1A, 1B such that the inner fitting part 5A may be fitted within the cylindrical inner space 6c of the outer fitting part 6A from the bottom side of the inner fitting part 5A (from the side of the female threaded portion 5d).

In the course of the above, because the outer face 5a of the inner fitting part 5A and the inner face 6b of the outer fitting part 6A are formed as approximately square shapes which are non-rotatable relative to each other, the fitting can be readily done with fixing the pressing part 5C of the first clamping member 5 and the pressing part 6B of the second clamping member 6 in the predetermined relative position relation extending in the same direction. That is, the inner fitting part 5A will be fitted to the outer fitting part 6A in such a manner that the pressing face 5e of the pressing part 5C of the first clamping member 5 and the pressing face 6e of the pressing part 6B of the second clamping member 6 may be opposed to each other in the flange coupling direction.

Figure 7:
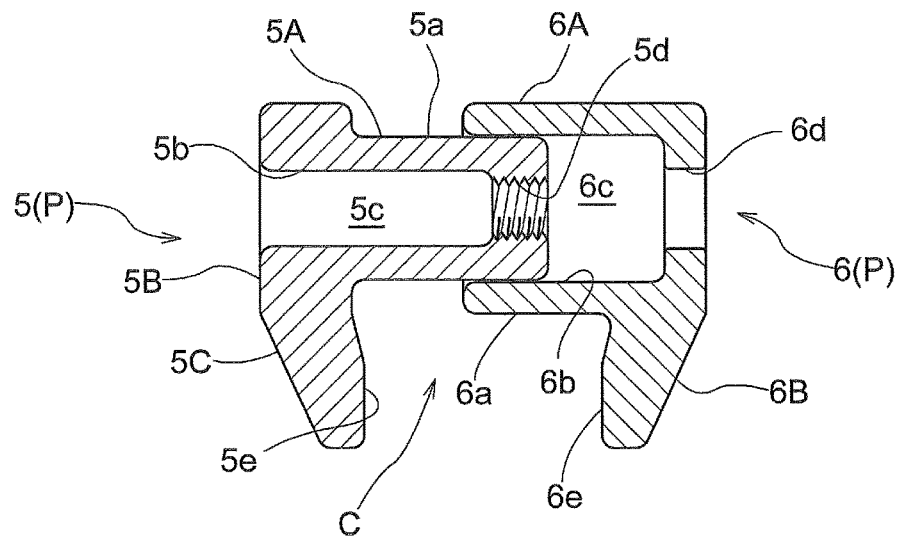
FIG. 7 is view showing schematic arrangements of the first and second clamping members.

As shown in FIG. 7, under the state of the inner fitting part 5A and the outer fitting part 6A being fitted to each other, the pressing part 5C of the first clamping member 5, the outer face 5a of the inner fitting part 5A in cooperation with the pressing part 6B of the second clamping member 6 and the outer face 6a of the outer fitting part 6A, form an approximately U-shaped receded portion C. This receded portion C is externally attachable from the radial outer side to portions adjacent the bolt connecting portions in the circumferential direction of the two flange portions 1A, 1B. Therefore, the above-described fitting between the inner fitting part 5A and the outer fitting part 6A is effected to such an extent that temporarily, in the flange coupling direction, the distance between the pressing face 5e of the pressing part 5C of the first clamping member 5 and the pressing face 6e of the pressing part 6B of the second clamping member 6 becomes greater than the distance between the outer face 1a of the flange part 1A and the outer face 1a of the flange part 1B.

Incidentally, the above-described fitting between the inner fitting part 5A and the outer fitting part 6A is configured such that the size of the overlapped portion between the inner fitting part 5A and the outer fitting part 6A in the flange coupling direction (coupling distance) is freely adjustable within a predetermined range. And, in association with this adjustment, the distance between the pressing face 5e of the pressing part 5C of the first clamping member 5 and the pressing face 6e of the pressing part 6B of the second clamping member 6 is freely adjustable within a predetermined range. Therefore, the first clamping member 5 and the second clamping member 6 can be fastened and fixed to each other by the fastening means 7 to be described later, with the size (coupling distance) of the overlapped portion between the inner fitting part 5A and the outer fitting part 6A in the flange coupling direction and the distance between the pressing face 5e and the pressing face 6e being appropriately set respectively And, when the receded portion C is to be externally attached to the portion adjacent the bolt connecting portions of the two flange parts 1A, 1B, the outer face 6a of the outer fitting part 6A on the side where the pressing part 6B extends (a portion of the receded portion C) will be brought into contact with at least one of the outer circumferential faces 1c, 1c of the two flange parts 1A, 1B, whereby the first clamping member 5 and the second clamping member 6 can be attached at predetermined external attachment positions (see FIG. 7 and FIG. 9). Namely, the outer face 6a of the outer fitting part 6A on the side where the pressing part 6B extends is configured as an "attachment regulating portion" that comes into contact with the outer circumferential faces 1c, 1c of the two flange portions 1A, 1B, thus regulating the external attachment portion to a set external attachment position.

Figure 9:
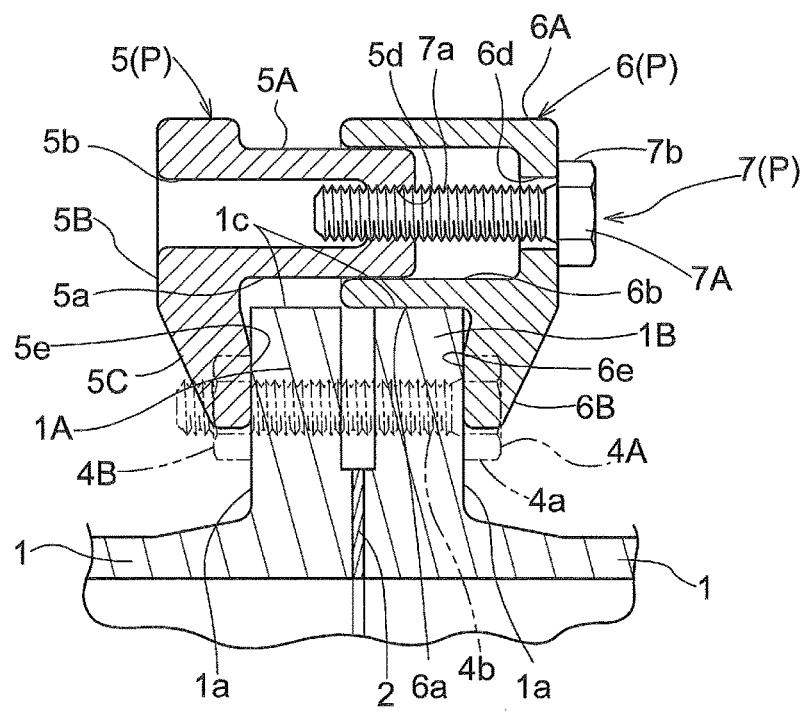
FIG. 9 is a vertical section showing the attachment state of the first and second clamping members.

In succession, after the attachment of the receded portion C to the predetermined external attachment position, under the state of the outer face 6a of the outer fitting part 6A on the extending side of the pressing part 6B being placed in abutment against at least one of the outer circumferential faces 1c, 1c of the two flange parts 1A, 1B, the inner fitting part 5A and the outer fitting part 6A will be drawn toward each other in the flange coupling direction until the pressing face 5e of the pressing part 5C of the first clamping member 5 comes into contact with the outer face 1a of the flange part 1A and also the pressing face 6e of the pressing part 6B of the second clamping member 6 comes into contact with the outer face 1a of the flange part 1B, whereby the inner fitting part 5A will be fitted into the cylindrical inner space 6c of the outer fitting part 6A (see FIG. 7 and FIG. 9).

Figure 8:
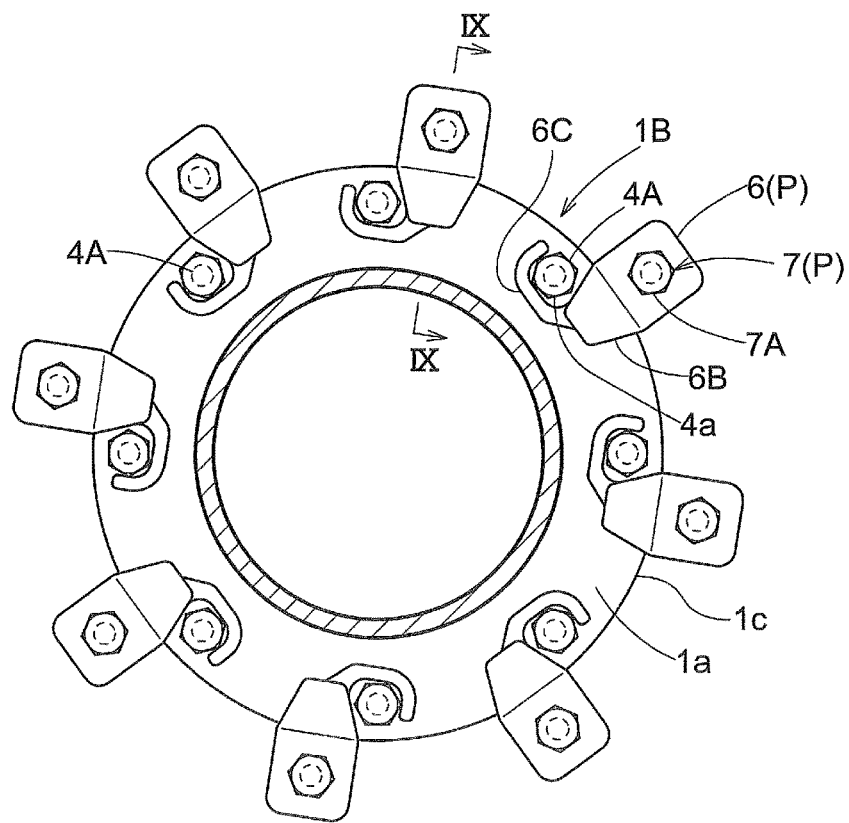
FIG. 8 is a side view showing the attachment state of the first and second clamping members.

In the course of the above, the detachment preventing arm 6C of the second clamping member 6 which is provided in the form of a recess extending to surround the head portion 4a of the connecting bolt 4A adjacent the second clamping member 6 from the radially inner side to the radially outer side of the flange part 1B will be brought into contact with or to vicinity of the head portion 4a of this connecting bolt 4A from the radially inner side (see FIG. 6 and FIG. 8). The extension direction of this detachment preventing arm 60 is set as the same direction as the direction of co-rotation of the second clamping member 6 provided with this detachment preventing arm 6C when the fastening bolt 7A is rotated to its fastening side. Namely, the detachment preventing arm 6C is configured to extend, as seen in its side view, from the leading end portion of the pressing part 6B of the second clamping member 6 toward the fastening direction of the fastening bolt 7A about the insertion hole 6d formed at the center portion of the outer fitting part 6A (in this embodiment, as the fastening bolt 7A is configured as a right-hand thread, the extension direction is the clockwise direction about the insertion hole 6d, that is, toward the right side of the pressing part 6B relative to the extension direction of the pressing part 6B from the insertion hole 6d).

Next, the male threaded portion 7a of the fastening bolt 7A will be inserted into the cylindrical inner space 6c via the insertion hole 6d from the outer side of the outer fitting part 6A in the flange coupling direction and then be threaded, and fastened and fixed to the female threaded portion 5d of the inner fitting part 5A fitted in the cylindrical inner space 6c until the head portion 7b of this fastening bolt 7A comes into contact with the outer face (not shown) of the outer fitting part 6A. During this fastening/fixing of the fastening bolt 7A, even if the second clamping member 6 is co-rotated in the fastening direction, as the detachment preventing arm 60 comes into contact with the head portion 4a of the connecting bolt 4A adjacent thereto, further co-rotation is prevented. Further, since the second clamping member 6 is supported by the pressing part 6B, the outer face 1a of the flange part 1B, the detachment preventing arm 6C and the head portion 4a of the connecting bolt 4A, the fastening operation of the fastening bolt 7A can be carried out in a stable manner.

Incidentally, the side face of the detachment preventing arm 60 opposed to the outer face 1a of the flange part 1B is disposed farther from the outer face 1a of the flange part 1B than the pressing face 6e of the pressing part 6B of the second clamping member 6 provided with this detachment preventing arm 6C. Therefore, even when the pressing face 6e of the pressing part 6B is pressed against the outer face 1a of the flange part 1B by fastening of the fastening bolt 7A, the detachment preventing arm 6C will not come into contact with the outer face 1a of the flange part 1B, thus applying no load directly to the detachment preventing arm 60. Thus, damage of this detachment preventing arm 60 can be prevented.

Accordingly, by drawing the first clamping member 5 and the second clamping member 6 closer to each other in the flange coupling direction (axial direction) with the two pressing parts 50, 6B being placed in abutment to the outer faces 1a, 1a of the two flange portions 1A, 1B respectively the inner fitting part 5A will be fitted within the outer fitting part 6A, and the fastening/fixing operation can be carried out, with the inner fitting part 5A and the outer fitting part 6A being overlapped with each other in the flange coupling direction (axial direction). And, under this fastened/fixed state, the outer face 6a of the outer fitting part 6A on the side of extension of the pressing part 6B is placed in contact with at least one of the outer circumferential faces 1c, 1c of the two flange parts 1A, 1B.

Further, under the fastened/fixed state, the female threaded portion 5d of the inner fitting part 5A is located at the position adjacent the head portion 7b of the fastening bolt 7A, so the threading portion between the female threaded portion 5d and the male threaded portion 7a of the fastening bolt 7A is located near the position where the head portion 7b of the fastening bolt 7A comes into contact with the outer face of the outer fitting part 6A. As a result, the distance between the head portion 7b of the fastening bolt 7A and the threading portion in the flange coupling direction (axial direction) can be made relatively short. With this, even when a force in the bending direction (radial direction) or pulling direction (axial direction) is applied to the two flange parts 1A, 1B, inadvertent elongation or breakage of the fastening bolt 7A can be effectively prevented. Consequently, separation, displacement between two flange parts 1A, 1B or fluid leakage associated therewith can be effectively prevented. Moreover, the female threaded portion 5d can be disposed at the overlapped portion between the inner fitting part 5A and the outer fitting part 6A inside the cylindrical inner spaces 5c, 6c. So that, the length of the fastening bolt 7A can be made relatively short. Thus, protrusion of the leading end of the fastening bolt 7A to the outside of the cylindrical inner spaces 5c, 6c can be effectively prevented. Consequently, space saving can be achieved without impairment of the outer appearance of the flange coupling part reinforcing jig P.

Next, after the attachment of the flange coupling part reinforcing jig P described above, to and between the adjacent portions of all the other bolt connecting portions in both the flange portions 1A, 1B, other flange coupling part reinforcing jigs P will be externally attached one after another from the radially outer side. Incidentally, such external attachment can be done only for some of the adjacent portions of the bolt connecting portions.

With the above, once the first clamping member 5 and the second clamping member 6 have been fastened and fixed by the fastening means 7, even in the event of application of a force to the two flange parts 1A, 1B in the bending direction (radial direction), this force can be received not only by the fastened portion of the fastening means 7, but also the overlapped portion between the inner fitting part 5A and the outer fitting part 6A, so that the stress applied to the fastened portion of the fastening means 7 can be reduced. Further, once the first clamping member 5 and the second clamping member 6 have been fastened and fixed by the fastening means 7, the outer face of the outer fitting part 6A in which the inner fitting part 5A is fitted is in contact with at least one of the outer circumferential faces 1c, 1c of the two flange parts 1A, 1B. So, in the event of application of a force to the two flange parts 1A, 1B in the bending direction (radial direction), this force can be received also by the contact portions between the outer face 6a of this outer fitting part 6A and the outer circumferential face(s) 1c, 1c of the two flange parts 1A, 1B. Thus, the stress applied to the fastening means 7 and the overlapped portion between the inner fitting part 5A and the outer fitting part 6A can be reduced. Moreover, once the male threaded portion 7a of the fastening bolt 7A has been inserted into the insertion hole 6d, a predetermined gap is formed between the outer circumferential face of the male threaded portion 7a and the inner circumferential face of the insertion hole 6d. Thus, if the fastening bolt 7A were slightly displaced in the radial direction due to application of a force in the bending direction (radial direction) to the two flange parts 1A, 1B, as long as this displacement is only of an amount equal to the predetermined gap, the male threaded portion 7a of the fastening bolt 7A will not come into contact with the insertion hole 6d, whereby inadvertent extension or breakage of the fastening bolt 7A can be prevented effectively.

Therefore, the flange coupling part reinforcing jig P can be easily attached to the two flange parts 1A, 1B. In addition, the coupling strength of the two flange parts 1A, 1B by the flange coupling part reinforcing jig P can be improved. Whereby, separation or displacement between the two flange parts 1A, 1B or leakage of tap water (an example of "fluid") associated therewith can be prevented even more reliably and, the earthquake-resistance of the conduit can be improved also.

Thus, the conduit including the two flange parts 1A, 1B can be reinforced into an earthquake-resistant conduit having a predetermined earthquake-resistant performance (having an anti-separation force of 3 DkN or more (D is a nominal diameter)). At the same time, separation or displacement between the two flange parts 1A, 1B can be prevented easily and inexpensively.

Moreover, with the flange coupling part reinforcing jig P above, since the inner fitting part 5A is fitted within the outer fitting part 6A which is formed cylindrical and also the fastening bolt 7A of the fastening means 7 is inserted into the cylindrical inner space 5c inside the inner fitting part 5A, the disposing portions of the inner fitting part 5A and the outer fitting part 6A disposed at radially outer positions of the outer circumferential faces 1c, 1c of the two flange parts 1A, 1B can be used also as the disposing position of the fastening bolt 7A. With this, both the sizes of the flange coupling part reinforcing jig P fitted to the two flange parts 1A, 1B and the fastening bolt 7A in the flange coupling direction (axial direction) and the size of this flange coupling part reinforcing jig P on the radially outer side (radial direction) can be made smaller, so that space saving is made possible.

Further, even when distortion, deformation, relative displacement or the like should occur in the two flange portions 1A, 1B due to the weights of their own, an earthquake or the like, the detachment preventing arm 60 formed concave can come into contact with the head portion 4a of the connecting bolt 4A in a reliable manner, and this contact state can be maintained. Consequently, inadvertent detachment of the flange coupling part reinforcing jig P from the two flange parts 1A, 1B can be prevented even more reliably. Also, similarly, at whatever position in the circumferential direction of the two flange parts 1A, 1B the flange coupling part reinforcing jig P may be provided, downward detachment of this flange coupling part reinforcing jig from the two flange parts can be prevented.

Here, as described above, with the flange coupling part reinforcing jig P, through desired adjustment of the size of the overlapped portion (coupling distance) between the inner fitting part 5A of the first clamping member 5 and the outer fitting part 6A of the second clamping member 6 in the flange coupling direction (axial direction) within the predetermined range, the distance between the pressing face 5e of the pressing part 50 of the first clamping member 5 and the pressing face 6e of the pressing part 6B of the second clamping member 6 can be adjusted as desired within the predetermined range.

Figure 10:
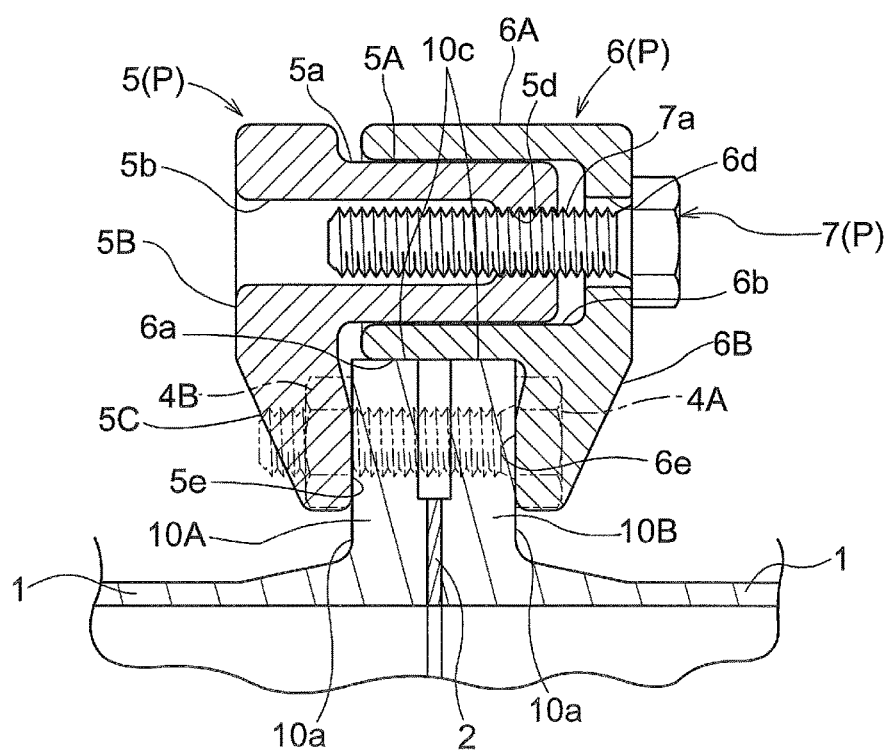
FIG. 10 is a vertical section showing the attachment state of the first and second clamping members.

Therefore, in case the thickness of the two flange parts 1A, 1B is to be changed in accordance with the nominal diameter or set pressure of the two flange parts 1A, 1B, for instance, as shown in FIG. 10, in the case of fitting the flange coupling part reinforcing jig P to two flange parts 10A, 10B which have a smaller thickness than the two flange parts 1A, 1B also, with adjustment of the size of the overlapped portion (coupling distance) between the inner fitting part 5A and the outer fitting part 6A (adjustment to increase the coupling distance in the case of FIG. 10 illustration), by placing the pressing face 5e of the pressing part 50 of the first clamping member 5 in contact with the outer face 10a of the flange part 10A and placing the pressing face 6e of the pressing part 6B of the second clamping member 6 in contact with the outer face 10a of the flange part 10B, the male threaded portion 7a of the fastening bolt 7A can be threaded to the female threaded portion 5d of the inner fitting part 5A; and consequently the inner fitting part 5A and the outer fitting part 6A, hence, the first clamping member 5 and the second clamping member 6, can be fastened and fixed to these two flange parts 10A, 10B effectively As described above, even when the thickness of the respective flange parts 1A, 1B is changed in accordance with the nominal diameter or set pressure of the flange parts 1A, 1B, as the fastening means 7 consists essentially of the fastening bolt 7A which is inserted from the outside of the outer fitting part 6A through the insertion hole 6d into the cylindrical inner spaces 5c, 6c of the inner fitting part 5A and the outer fitting part 6A and the female threaded portion 5d to which the fastening bolt 7A formed in the inner circumferential face 5b of the inner fitting part 5A to be threaded with the fastening bolt 7A, and the female threaded portion 5d is disposed at one end portion on the side of the outer fitting part 6A of the overlapped portion between the inner fitting part 5A and the outer fitting part 6A within the cylindrical inner spaces 5c, 6c, the threading portion between the female threaded portion 5d and the male threaded portion 7a of the fastening bolt 7A is disposed at the position near the contact position where the head portion 7b of the fastening bolt 7A comes into contact with the outer fitting part 6A. As a result, the distance between the head portion 7b of the fastening bolt 7A and this threading portion in the flange coupling direction (axial direction) can be made relatively small, so that even in the event of application of a force to the two flange parts 1A, 1B in the bending direction (radial direction) or pulling direction (axial direction), inadvertent elongation or breakage of the fastening bolt 7A can be prevented effectively Further, with this possibility of rendering the above distance relatively small, it become possible to employ a standard bolt as the fastening bolt 7A, whereby the flange coupling part reinforcing jig P can be made inexpensively.

[Other Embodiments]

Figure 11:
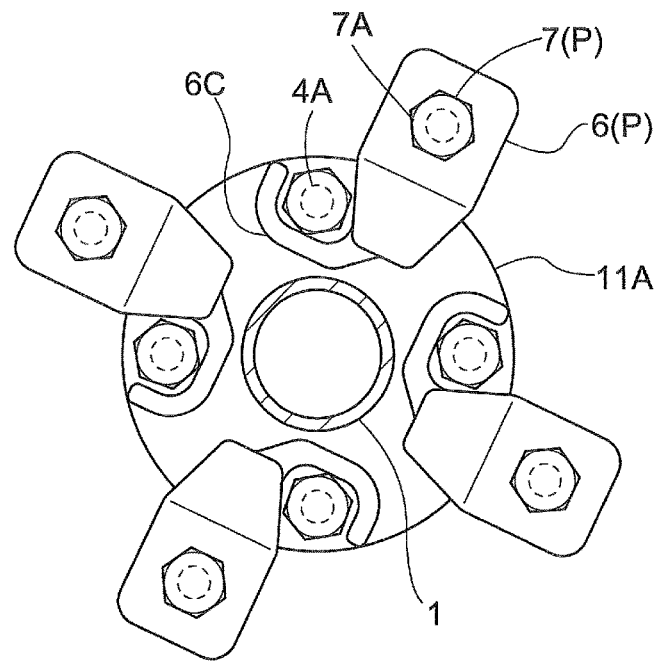
FIG. 11 is side view showing attachment state of first and second clamping members relating to a further embodiment.

(A) In the foregoing embodiment, the two flange parts 1A, 1B are connected to each other by 8 (eight) pairs of connecting bolts 4A and connecting nuts 4B. However, the number of the connecting bolts 4A and the connecting nuts 4B can be adjusted as desired, in accordance with the nominal diameter or set pressure or the like of the flange parts 1A, 1B. For instance, as shown in FIG. 11, the two flange parts 11A, 11B can be connected to each other by 4 (four) pairs of connecting bolts 4A and connecting nuts 4B and the flange coupling part reinforcing jig P can be attached to adjacent portions of the bolt connected portions.

(B) In the foregoing embodiment, in the procedure of attaching the flange coupling part reinforcing jig P to the two flange parts 1A, 1B, firstly, the inner fitting part 5A of the first clamping member 5 and the outer fitting part 6A of the second clamping member 6 are engaged with each other to some extent, then, the receded portion C formed by the inner fitting part 5A, the pressing part 5C, the outer fitting part 6A and the pressing part 6B is externally fitted to the two flange parts 1A, 1B. However, the attaching procedure of the flange coupling part reinforcing jig P can be changed as desired.

For instance, according to an alternative procedure, the pressing part 6B of the second clamping member 6 will be placed in contact with the outer face 1a of the flange part 1B. Then, the detachment preventing arm 6C will be brought into contact with or vicinity of the head portion 4a of the connecting bolt 4A from the radially inner side of the flange part 1B. Further, with placing the outer fitting part 6A radially outwardly of the outer circumferential face 1c of the flange part 1B, the inner fitting part 5A of the first clamping member 5 will be fitted within the outer fitting part 6A from the flange coupling direction and the pressing part 50 will be placed in contact with the outer face 1a of the flange part 1A. Thereafter, the male threaded portion 7a of the fastening bolt 7A will be threaded to the female threaded portion 5d of the inner fitting part 5A through the insertion hole 6d of the outer fitting part 6A and the first clamping member 5 and the second clamping member 6 will be externally fitted to the two connecting flange parts 1A, 1B.

Further alternatively, for instance, like the foregoing embodiment, in the process of attaching the flange coupling part reinforcing jig P to the two flange parts 1A, 1B, after the inner fitting part 5A of the first clamping member 5 and the outer fitting part 6A of the second clamping member 6 are fitted to each other to some extent, the male threaded portion 7a of the fastening bolt 7A may be threaded to some extent to the female threaded portion 5d of the inner fitting part 5A via the insertion hole 6d of the outer fitting part 6A. Then, the receded portion C of the first clamping member 5 and the second clamping member 6 may be externally fitted to the two connecting flange parts 1A, 1B, and then, the fastening bolt 7A can be fastened fully.

(C) In the foregoing embodiment, the detachment preventing arm 60 is provided only to the second clamping member 6. Instead, when needed, the detachment preventing arm 6C can be provided in both or one of the first clamping member 5 and the second clamping member 6. In this case, an arrangement can be provided such that the detachment preventing arm 6C is caused to come into contact or approach the head portion 4a of the connecting bolt 4A or the connecting nut 4B from the radially inner side of the two flange parts 1A, 1B.

Further alternatively, the detachment preventing arm 60 may not be provided in the form of a recess which extends around the head portion 4a of the connecting bolt 4A or the connecting nut 4B from the radially inner side to the radially outer side of the two flange parts 1A, 1B, but the detachment preventing arm 60 may be provided instead in the form of a bar-like member which comes into contact with the head portion 4a of the connecting bolt 4A or the connecting nut 4B from the radially inner side of the two flange parts 1A, 1B.

Incidentally, the detachment preventing arm 60 can be omitted entirely.

(D) In the foregoing embodiment, the inner fitting part 5A is included in the first clamping member 5 and the outer fitting part 6A is included in the second clamping member 6. Instead, the outer fitting part may be included in the first clamping member 5 and the inner fitting part may be included in the second clamping member 6.

(E) In the foregoing embodiment, the fitting shapes of the inner fitting part 5A of the first clamping member 5 and the outer fitting part 6A of the second clamping member 6, namely, the shapes of the outer face 5a of the inner fitting part 5A and the inner face 6b of the outer fitting part 6A, are approximately square shapes in their cross sectional views. However, any other shape can be used also as long as the relative rotation about the flange coupling direction is inhibited with the inner fitting part 5A and the outer fitting part 6A being fitted to each other. For instance, as viewed in their cross sectional views, the shapes of the outer face 5a of the inner fitting part 5A and the inner face 6b of the outer fitting part 6A can be oval shapes, polygonal shapes, etc.

(F) In the foregoing embodiment, the inner fitting part 5A of the first clamping member 5 is provided as a bottomed cylindrical part which defines therein the cylindrical inner space 5c and the female threaded portion 5d is formed as an opening in the bottom of the inner fitting part 5A; further, the outer fitting part 6A of the second clamping member 6 is provided as a bottomed cylindrical part which defines therein the cylindrical inner space 6c and the insertion hole 6d is formed in the bottom of the outer fitting part 6A, so that the fastening means 7 is comprised of the fastening bolt 7A inserted into the insertion hole 6d and threaded to the female threaded portion 5d and of this female threaded portion 5d. However, the arrangements of the first clamping member 5, the second clamping member 6 and the fastening means 7 can vary as desired.

Figure 12:
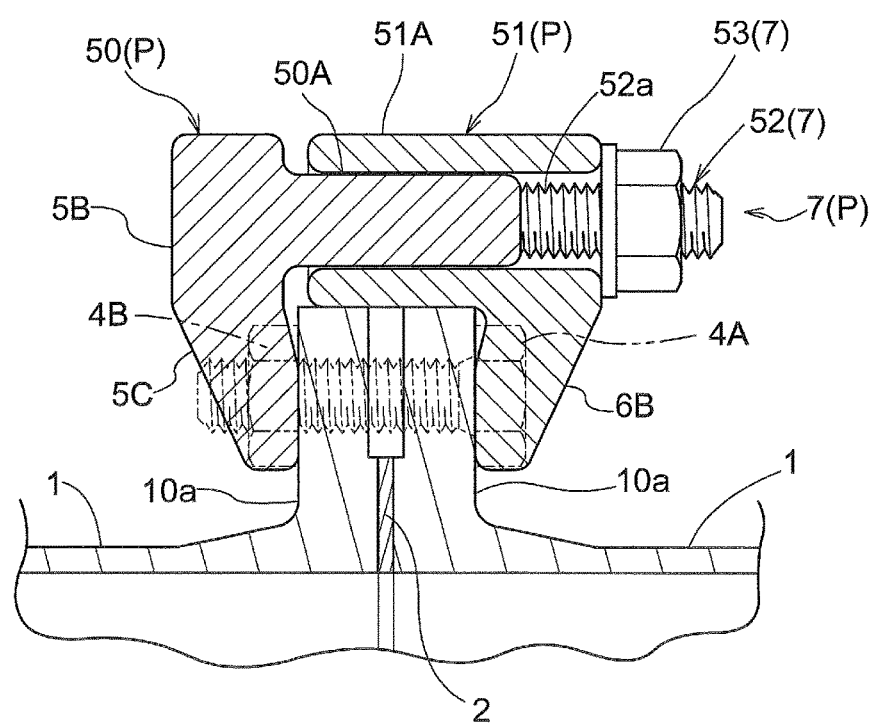
FIG. 12 is a vertical section view showing the attachment state of the first and second clamping members relating to the further embodiment.

For instance, in an alternative arrangement shown in FIG. 12, an inner fitting part 50A of a first clamping member 50 is provided as an approximately angular-bar like part having an outer diameter that allows fitting into an outer fitting part 51A of a second clamping member 51, and an outer fitting part 51A of a second clamping member 51 is provided as a tubular part. Incidentally, the first clamping member 50 includes the brim-like portion 5B and the pressing part 5C provided in the foregoing embodiment and the second clamping member 51 includes the pressing part 6B provided in the foregoing embodiment. And, on the side of the leading end of the inner fitting part 50A, a bolt 52 having a male threaded portion 52a is provided as a protrusion which protrudes in the flange coupling direction (longitudinal direction of the inner fitting part 50A). Then, when the inner fitting part 50A is fitted non-rotatably within the outer fitting part 51A, the leading end of the male threaded portion 52a protrudes to the outside of the outer fitting part 51A and to this protruding portion, a fastening nut 53 will be threaded until it comes into contact with the outer face of the outer fitting part 51A from the outer side, thus fastening and fixing the first clamping member 50 and the second clamping member 51.

Figure 13:
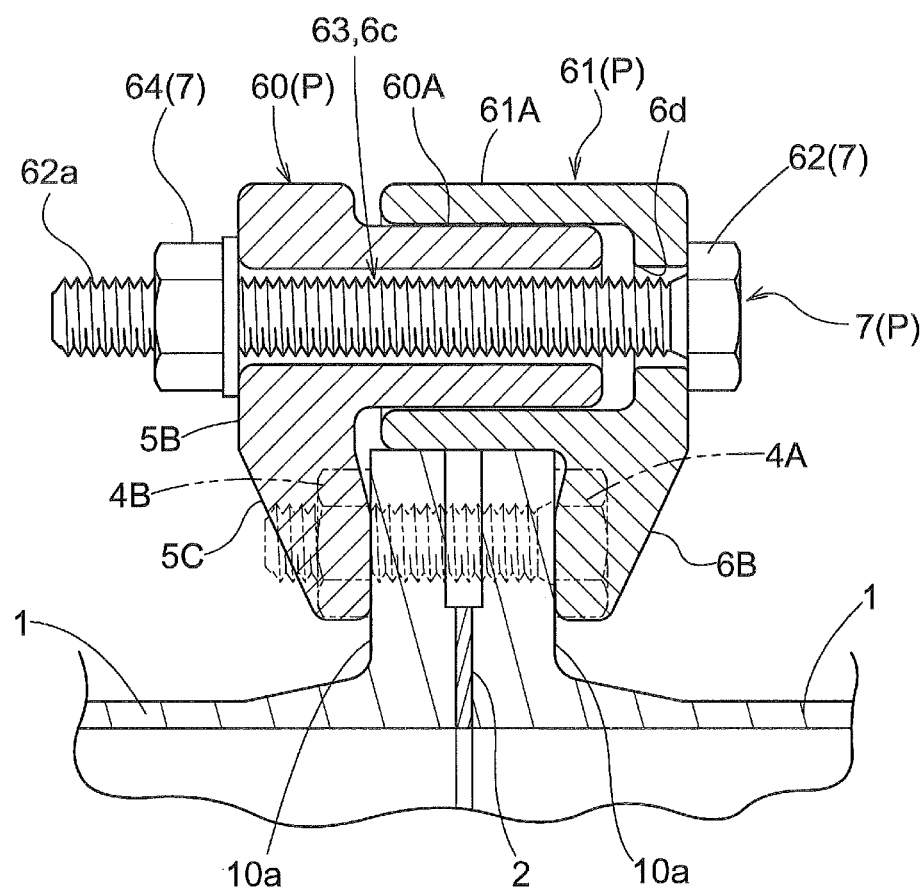
FIG. 13 is a vertical section view showing attachment state of first and second clamping members relating to a further embodiment.

Further alternatively, in an arrangement shown in FIG. 13, an inner fitting part 60A of a first clamping member 60 is provided as a tubular part, and this inner fitting part 60A is configured to have an outer diameter that allows non-rotatable fitting thereof within an outer fitting part 61A of a second clamping member 61 and also an inner diameter capable of forming a cylindrical inner space 63 that allows insertion of a male threaded portion (not shown) of a fastening bolt 62. Namely, in this case, no female threaded portion is formed in the inner fitting part 60A. Incidentally, the first clamping member 60 includes the brim-like portion 5B and the pressing part 5C provided in the foregoing embodiment and the second clamping member 61 includes the pressing part 6B (insertion hole 6d) provided in the foregoing embodiment. And, the fastening means 7 includes the fastening bolt 62 which is to be inserted into cylindrical inner spaces 63, 6c of the inner fitting part 60A and the outer fitting part 61A and to extend therethrough from one outer side thereof and a fastening nut 64 which is to be threaded to a protruding male threaded portion 62a of the fastening bolt 62 from the other outer side thereof. And, when the inner fitting part 60A is fitted within the outer fitting part 61A, the protruding male threaded portion 62a protrudes to the outside of the outer fitting part 61A and to this protruding male threaded portion 62a, the fastening nut 64 is threaded until this comes into contact with an outer face side of the outer fitting part 61A from the outer side thereof, thus fastening and fixing the first clamping member 60 and the second clamping member 61.

With the above, simply by forming the inner fitting part 60A and the outer fitting part 61A cylindrical, there is no need to form threads in these parts. So, the flange coupling part reinforcing jig P can be provided with a convenient and inexpensive configuration.

(G) In the foregoing embodiment, the inner fitting part 5A of the first clamping member 5 is provided as a bottomed cylindrical part which defines therein the cylindrical inner space 5c and in this cylindrical inner space 5c, the side thereof where the brim-like portion 5B and the pressing part 5C are formed is opened. This opened portion can be closed with a plug member made of rubber or the like. With this, intrusion of dust or the like into the cylindrical inner space 5c can be effectively prevented and also improvement of outer appearance is made possible.

(H) In the foregoing embodiment, there was explained the arrangement wherein the two flange parts 1A, 1B are configured as the so-called RF flanges. However, as long as it is flange coupling, any other type of flange coupling can be used also. For instance, it can be the so-called GF type flange.

(I) In the foregoing embodiment, there was explained an example wherein the flange coupling part reinforcing jig P is attached to the two flange parts 1A, 1B formed in two water pipes 1, 1 made of cast iron as an example of conduit constituting a fluid piping system (conduit). Instead, the fluid pipe can be a pipe in which a gas or a liquid is caused to flow.

INDUSTRIAL APPLICABILITY

As described above, it has become possible to provide a flange coupling part reinforcing jig capable of reinforcing a conduit including two flange parts into an earthquake-resistant conduit having a predetermined earthquake-resistance performance and yet capable of easily and economically preventing separation or displacement between the two flange parts.

REFERENCE SIGNS LIST 1 water pipe (fluid pipe)
1A flange part
1B flange part
1a outer face
1c outer circumferential face 4A connecting bolt
4a head portion
4B connecting nut
5 first clamping member (clamping member)
5A inner fitting part
5C pressing part
5a outer face
5b inner circumferential face
5c cylindrical inner space
5d female threaded portion (fastening means)
5e pressing face
6 second clamping member (clamping member)
6A outer fitting part
6B pressing part
6C detachment preventing arm
6a outer face (attachment regulating portion)
6b inner face
6c cylindrical inner space
6d insertion hole
6e pressing face
7 fastening means
7A fastening bolt (fastening means)
7a male threaded portion
62 fastening bolt (fastening means)
62a protruding male threaded portion
64 fastening nut (fastening means)
P flange coupling part reinforcing jib
C receded portion

The invention claimed is:

1. A flange coupling part reinforcing jig comprising:
a pair of clamping members having pressing parts capable of coming into contact respectively with outer radial faces of two flange parts which are bolt-connected; and
a fastener for fixedly fastening the two clamping members by drawing them to each other in a flange coupling direction, with the pressing parts of the clamping members being placed in abutment with the outer radial faces of the flange parts;
wherein at portions of the two clamping members opposed to each other in the flange coupling direction, there are formed an inner fitting part on one of the clamping members, and an outer fitting part on the other clamping member, wherein the inner fitting part is fitted within the outer fitting part in the flange coupling direction at a position more radially outward than outer circumferential faces of the two flange parts, and
each said pressing part (5C, 6B) is laterally tapered with respect to a direction normal to the outer radial faces of the two flange parts and is also inclined with respect to a direction parallel to the outer radial faces of the two flange parts.

2. The flange coupling part reinforcing jig according to claim 1 wherein when the inner fitting part and the outer fitting part of the two clamping members are fitted to each other, a receded portion is formed by the pressing part and the inner fitting part of one clamping member together with the pressing part and the outer fitting part of the other clamping member, and the receded portion is externally attachable from a radially outer side relative to portions of the two flange parts adjacent bolt-connected positions thereof; and the externally attachable portion is configured as an attachment regulating portion that comes into contact with the outer circumferential faces of the two flange portions, thus regulating the externally attachable portion to a set external attachment position.

3. The flange coupling part reinforcing jig according to claim 1, wherein the inner fitting part and the outer fitting part have fitting shapes incapable of rotation relative to each other.

4. The flange coupling part reinforcing jig according to claim 1, wherein the inner fitting part and the outer fitting part are formed cylindrical respectively, and a fastening bolt of the fastener is inserted into cylindrical inner spaces of the inner fitting part and outer fitting part.

5. The flange coupling part reinforcing jig according to claim 4, wherein the fastener comprises the fastening bolt, which is inserted from the outer side of the outer fitting part into the cylindrical inner spaces of the inner fitting part and the outer fitting part, and a female threaded portion formed in an inner circumferential face of the inner fitting part and threadingly fitted with the fastening bolt.

6. The flange coupling part reinforcing jig according to claim 5, wherein the female threaded portion is formed at one end on the side of the outer fitting part in the inner circumferential face of the inner fitting part.

7. The flange coupling part reinforcing jig according to claim 4, wherein the fastener comprises the fastening bolt, which is inserted from one outer side into the cylindrical inner spaces of the inner fitting part and the outer fitting part through the spaces, and a fastening nut threadingly fitted on a protruding male threaded portion of the fastening bolt from the other outer side.

8. A flange coupling part reinforcing jig comprising:
a pair of clamping members having pressing parts capable of coming into contact respectively with outer radial faces of two flange parts which are bolt-connected; and
a fastener for fixedly fastening the two clamping members by drawing them into each other in a flange coupling direction, with the pressing parts of the clamping members being placed in abutment with the outer radial faces of the flange parts, wherein
at portions of the two clamping members opposed to each other in the flange coupling direction, there are formed an inner fitting part on one of the clamping members, and an outer fitting part on the other clamping member, wherein the inner fitting part is fitted within the outer fitting part in the flange coupling direction at a position more radially outward than outer circumferential faces of the two flange parts, and
one of the pair of clamping members includes a detachment preventing arm extending from a radially inner portion thereof to come into contact, from a radial inner side, with a head portion of a connecting bolt connecting the two flange parts or a fastening nut thread-fitted to the connecting bolt.

9. The flange coupling part reinforcing jig according to claim 8, wherein the detachment preventing arm is formed as a receded portion which extends around the head portion of the connecting bolt or the connecting nut from the radially inner side to the radially outer side.

10. The flange coupling part reinforcing jig according to claim 9, wherein a detachment preventing arm extending direction is set as a same direction as a direction when the one clamping member provided with this detachment preventing arm is rotated together with the fastening bolt when this fastening bolt is rotated to a fastening side.

11. The flange coupling part reinforcing jig according to claim 8, wherein a side face of the detachment preventing arm opposed to the outer radial face of the flange part is disposed on a side farther from the outer radial face of the flange part than the pressing face of the pressing part of the one clamping member provided with this detachment preventing arm.

\* \* \* \* \*